United States Patent Office 3,110,632
Patented Nov. 12, 1963

3,110,632
THERMAL CELL
Glenn Faber Zellhoefer, Normal, Ill., assignor to National Union Electric Corporation, Stamford, Conn., a corporation of Delaware
No Drawing. Filed Aug. 14, 1961, Ser. No. 131,106
5 Claims. (Cl. 136—100)

This invention relates to improvements in thermal cells and more particularly to a novel and improved anode for use in thermal cells.

A thermal cell is an electrochemical power supply utilizing as the electrolyte an inorganic salt composition which is solid and nonconducting at ordinary temperatures. The cell is activated by heating it to a temperature sufficiently high to fuse or melt the electrolyte which thereby becomes conductive so that electrical energy may then be withdrawn from the system. A plurality of thermal cells may be connected to provide a thermal battery characterized by long shelf life, ruggedness, and the ability to develop full voltage rapidly over a substantial range of ambient temperature.

Various designs and electrochemical systems are known for use in thermal cells. For example, the article "Thermal Batteries," by Robert B. Goodrich and Richard C. Evans, J. Electrochem. Soc., 99, 207C (1952), described a thermal cell assembly utilizing sheet calcium anodes, nickel screen cathodes coated with a fused layer of 80% tungstic oxide and 20% lead chromate, and glass cloth electrolyte carriers impregnated with a salt composition containing 55% potassium chloride and 45% lithium chloride.

The choice of anode and cathode for a thermal cell appears to be the controlling factor which determines the e.m.f. of the cell. For example, calcium and magnesium are the most commonly used anode metals, but a cell using an anode of calcium, which is more active electrochemically than magnesium, will have an open circuit voltage appreciably higher than an otherwise comparable cell using a magnesium anode. Consequently, calcium, if compatible with the other components of the system, is often used as the anode metal in order to obtain the advantage of increased voltage.

However, the chemical and physical properties of calcium are such that serious problems are sometimes encountered in the use of cells having calcium anodes. One such difficulty is the sensitivity of calcium to moisture whereby calcium reacts to form calcium oxide which results in deterioration of the anode. Another difficulty is the tendency of calcium to form a low melting lithium-calcium alloy when a calcium anode is utilized in conjunction with an electrolyte system containing a lithium salt. Eutectic mixtures of lithium and potassium halides are the most suitable fusible salts known for use in a thermal cell. Nevertheless, the usefulness of such cells is frequently limited by the tendency of the molten lithium salt to alloy with the calcium anode to form a low melting point Li-Ca alloy which readily flows and may cause electrical shorts in the cell or battery.

Accordingly, the primary object of the present invention is to provide a novel anode material for a thermal cell which affords substantially the same voltage characteristics as calcium but avoids certain disadvantages of calcium.

A further object of the invention is to provide a novel anode metal for a thermal cell which is not moisture sensitive.

Another object of the invention is to provide a novel anode metal which does not react with lithium salts to form a low melting alloy.

The foregoing objects of the invention are realized by means of certain novel anode metal compositions containing a minor amount of lithium alloyed with aluminum and magnesium. Such compositions may comprise from about 13 wt. percent to about 20 wt. percent lithium, from about 1 wt. percent to about 6 wt. percent aluminum, and from about 78 wt. percent to about 86 wt. percent magnesium, the amounts of the respective metals being selected from the foregoing ranges so as to total 100%. In any given thermal cell, an anode metal of the foregoing composition affords substantially the same voltage as calcium, is not moisture sensitive, and does not react with lithium salts to form a low melting point alloy.

The lithium-aluminum-magnesium anode of the present invention may be used in any suitable electrochemical system. Preferably, the electrolyte comprises a mixture of lithium chloride-potassium chloride or a mixture of lithium bromide-potassium bromide. A eutectic mixture is the most suitable, e.g. about 45 wt. percent lithium chloride and about 55 wt. percent potassium chloride. The cathode of the cell may be nickel, stainless steel or Inconel (alloy containing about 77.8 to about 80% nickel, about 13 to about 13.5% chromium, balance essentially iron). The cathode is used in conjunction with a suitable depolarizer, e.g. potassium chromate, calcium chromate, barium chromate, or lead chromate. Vanadium pentoxide may also be used as the depolarizer but in such case the electrolyte should comprise a lithium chloride-potassium chloride mixture since vanadium pentoxide reacts with the bromides.

The following specific example of a thermal cell utilizing the above-described anode will further illustrate the principles of the invention.

Example

A thermal cell as assembled using a conventional layered construction. The electrochemical components of the system were as follows:

Anode—alloy of about 15 wt. percent lithium, about 3 wt. percent aluminum, and about 82 wt. percent magnesium, M.P. about 601° C.
Anolyte—eutectic mixture of about 45 wt. percent lithium chloride and about 55 wt. percent potassium chloride, M.P. about 352° C.
Catholyte—about 62 wt. percent vanadium pentoxide and about 38 wt. percent of the above-described LiCl-KCl eutectic mixture
Cathode—nickel.

It was found that the above-described anode alloy did not react with water even at 210° C. Moreover, the alloy was unaffected by contact with molten lithium chloride-potassium chloride eutectic mixture. Comparative tests showed that the cell developed open circuit and load voltages about 0.55 volt greater than comparable cells using a magnesium anode.

I claim:
1. A thermal cell comprising in combination (1) a fusible salt electrolyte selected from the group consisting of lithium chloride-potassium chloride mixtures and lithium bromide-potassium bromide mixtures; (2) an anode comprising a lithium alloy containing from about 13 wt. percent to about 20 wt. percent lithium, from about 1 wt. percent to about 6 wt. percent aluminum, and from about 78 wt. percent to about 86 wt. percent magnesium, the amounts of the respective metals being chosen from the foregoing ranges to total 100%; and (3) a cathode selected from the group consisting of nickel, stainless steel, and Inconel.

2. The combination of claim 1 further characterized in that said electrolyte comprises a eutectic mixture of lithium chloride and potassium chloride, and said anode comprises a lithium alloy containing about 15 wt. percent lithium, about 3 wt. percent aluminum, and about 82 wt. percent magnesium.

3. A thermal cell comprising in combination (1) a fusible salt electrolyte comprising a lithium chloride-potassium chloride mixture; (2) an anode comprising a lithium alloy containing from about 13 wt. percent to about 20 wt. percent lithium, from about 1 wt. percent to about 6 wt. percent aluminum, and from about 78 wt. percent to about 86 wt. percent magnesium, the amounts of the respective metals being chosen from the foregoing ranges to total 100%; (3) a cathode selected from the group consisting of nickel, stainless steel, and Inconel; and (4) a depolarizer selected from the group consisting of potassium chromate, calcium chromate, barium chromate, lead chromate, and vanadium pentoxide.

4. The combination of claim 3 further characterized in that said electrolyte comprises a eutectic mixture of lithium chloride and potassium chloride, and said anode comprises about 15 wt. percent lithium, about 3 wt. percent aluminum, and about 82 wt. percent magnesium.

5. A thermal cell comprising in combination (1) a fusible salt electrolyte comprising a eutectic mixture of about 45 wt. percent lithium chloride and about 55 wt. percent potassium chloride; (2) an anode comprising a lithium alloy containing about 15 wt. percent lithium, about 3 wt. percent aluminum, and about 82 wt. percent magnesium; (3) a nickel cathode; and (4) a depolarizer comprising vanadium pentoxide.

References Cited in the file of this patent

UNITED STATES PATENTS

| | | |
|---|---|---|
| 2,605,297 | Dean | July 29, 1952 |
| 2,742,357 | Jackson | Apr. 17, 1956 |
| 2,747,991 | Hesse | May 29, 1956 |
| 2,934,583 | Stevens | Apr. 26, 1960 |